United States Patent [19]
Heffron et al.

[11] 4,080,852
[45] Mar. 28, 1978

[54] METHOD AND APPARATUS FOR MACHINING CRANKSHAFTS

[75] Inventors: Allan J. Heffron, Freeland; Henry J. Garnaat, Jackson; Laverne H. Kennedy, Saginaw, all of Mich.

[73] Assignees: CM Systems, Inc., Bay City; Crankshaft Machine Co., Jackson, both of Mich.

[21] Appl. No.: 775,255

[22] Filed: Mar. 7, 1977

[51] Int. Cl.² .................. B23B 3/00; B23B 5/18
[52] U.S. Cl. .................................. 82/1 C; 82/9
[58] Field of Search ............................ 82/1 C, 9

[56] References Cited

U.S. PATENT DOCUMENTS

| 2,138,522 | 11/1938 | Groene et al. | 82/9 |
| 2,141,466 | 12/1938 | Groene et al. | 82/1 C |
| 2,499,509 | 3/1950 | Kendall | 82/9 |
| 2,525,127 | 10/1950 | Groene et al. | 82/9 |
| 2,596,511 | 5/1952 | Siekmann et al. | 82/9 |
| 3,460,413 | 8/1969 | Hermann | 82/9 |

Primary Examiner—Harrison L. Hinson
Attorney, Agent, or Firm—Beaman & Beaman

[57] ABSTRACT

The invention pertains to the method and apparatus for machining crankshaft bearing and cheek surfaces wherein the cheek surfaces are turned by tungsten carbide tools in a dry-cutting operation and the bearing surface is turned by high-speed steel tools. The cheek and bearing machining is sequentially performed, the rate of crankshaft rotation and rate of tool movement during cheeking being considerably higher than during bearing machining, and the carbide and high speed tools are mounted upon a common tool carrier shiftable between two operative positions to permit the sequential turning operations to be rapidly sequentially performed during a single translation of the slide upon which the tools are mounted.

10 Claims, 9 Drawing Figures

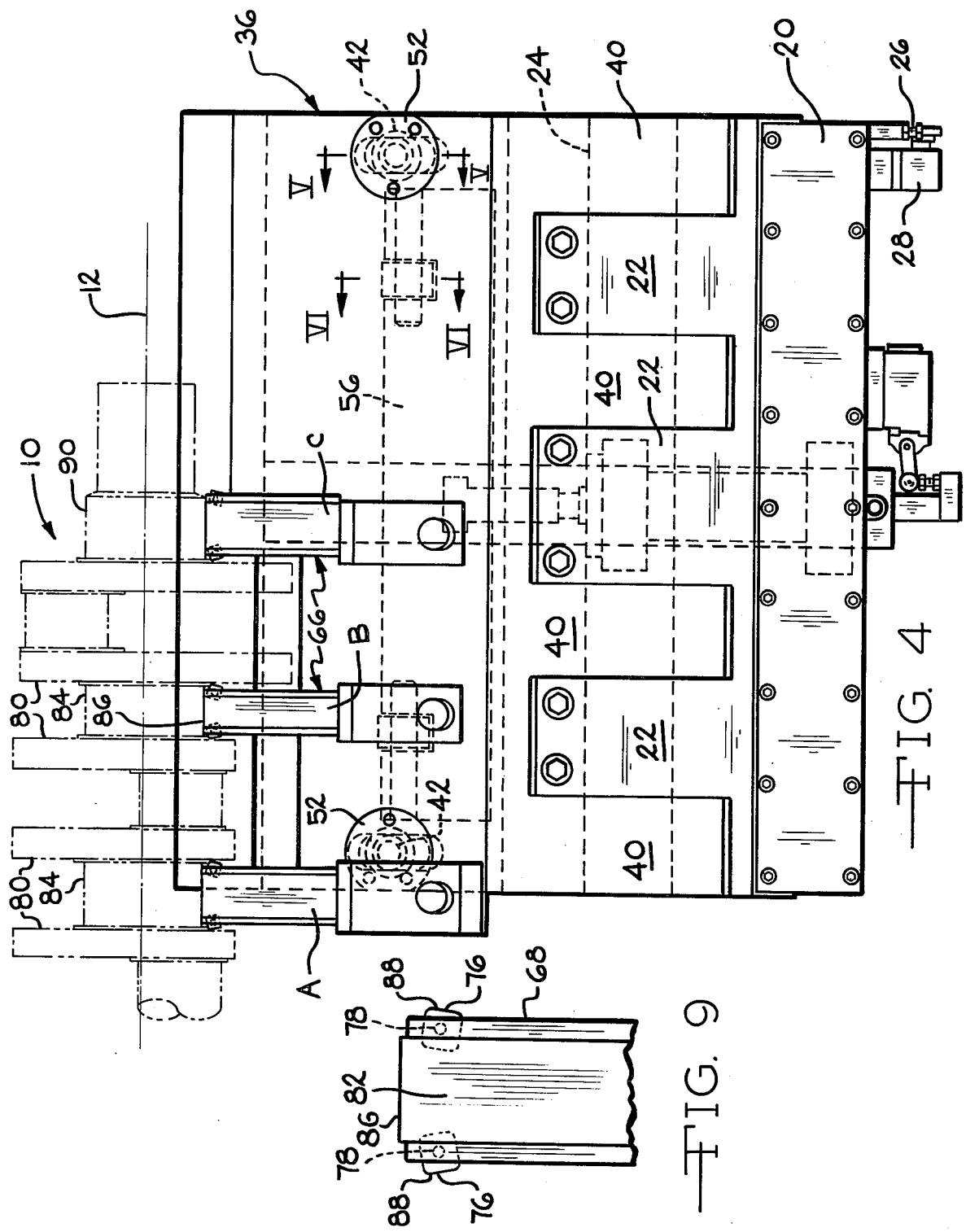

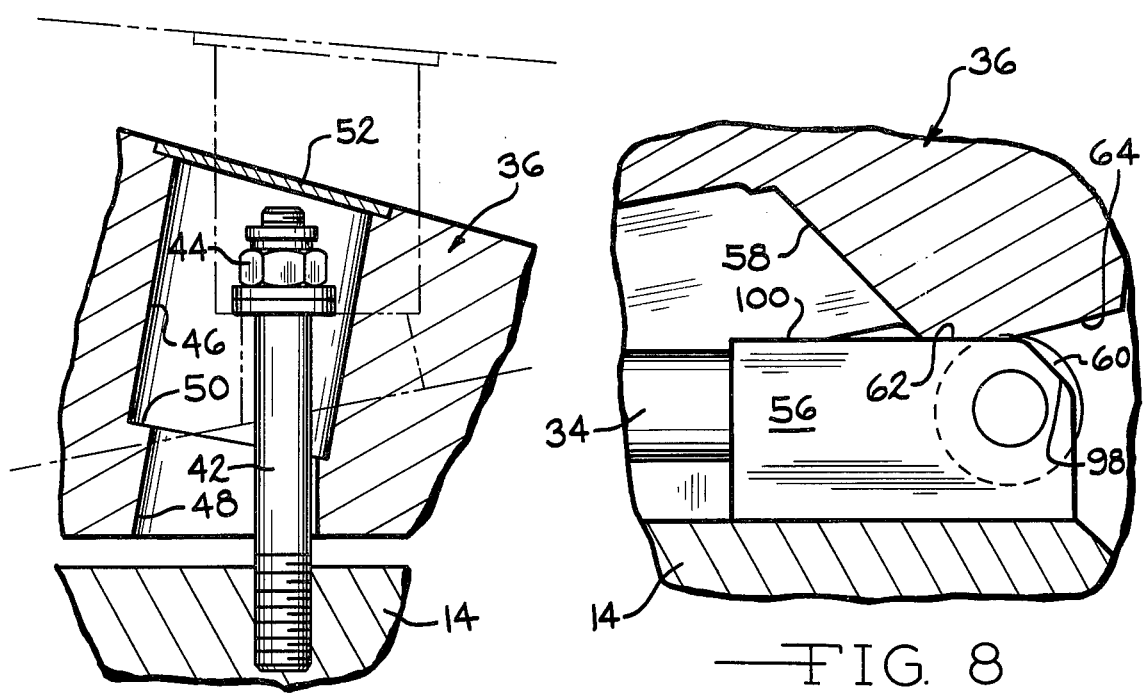
FIG. 5
FIG. 8
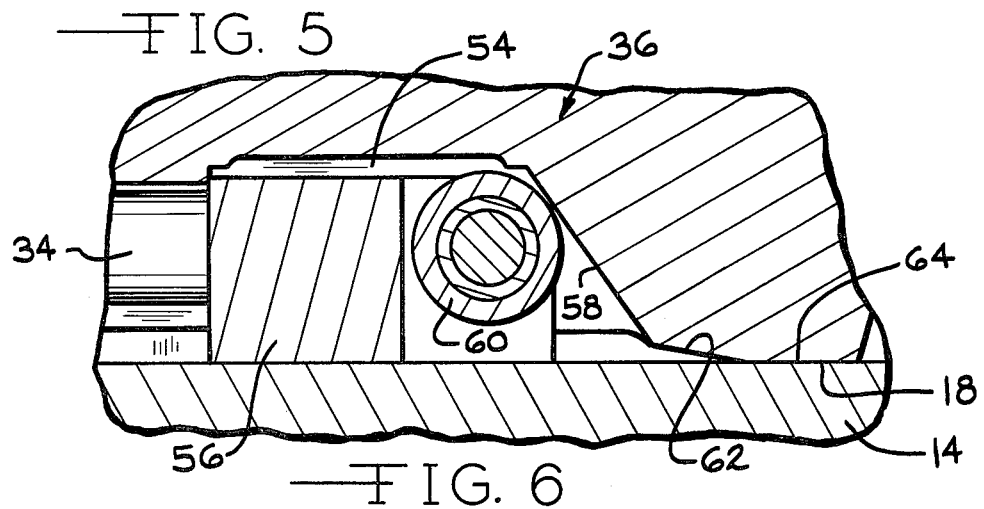
FIG. 6
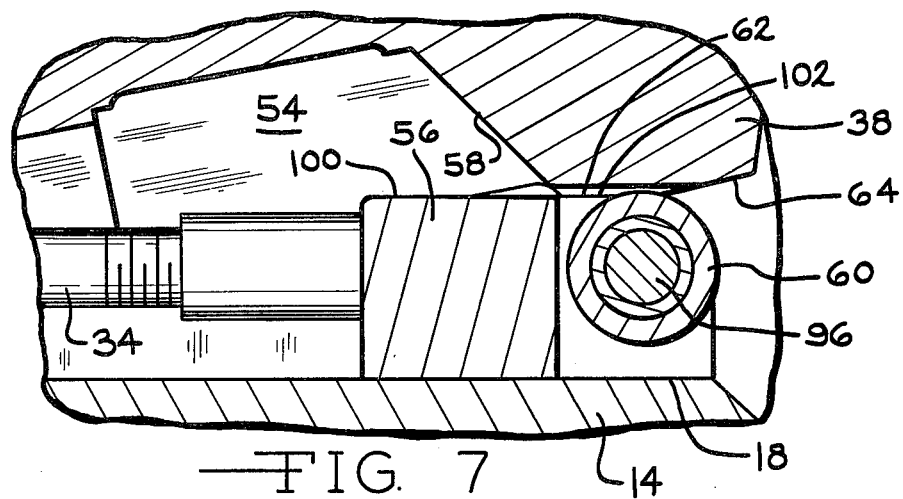
FIG. 7

METHOD AND APPARATUS FOR MACHINING CRANKSHAFTS

BACKGROUND OF THE INVENTION

The invention relates to the method and apparatus for turning crankshaft surfaces utilizing a plurality of cutting tools of diverse characteristics.

In the machining of crankshafts for internal combustion engines a number of turning operations are utilized to produce the finished surfaces. For instance, the surfaces of a crankshaft to be machined include main cylindrical bearings, cylindrical pin bearings, radial thrust bearing surfaces, and cheek surfaces radially oriented to the crankshaft axis and axially located in substantial alignment with the ends of bearing surfaces.

To machine the plurality of surfaces it has long been common to employ a separate turning tool for each surface machined, and a plurality of tools are often used for both rough and finish turning of the same surface.

In the turning art, a variety of materials have been utilized in the manufacture of the cutting tools in order to achieve desired characteristics. For instance, the most common turning tools are formed of high-speed steel which is capable of cutting an accurate finish within close tolerances, and may be accurately shaped and contoured but high-speed turning tools require relatively slow cutting speeds, and also require relatively frequent sharpening.

The advantages of utilizing tungsten carbide cutting tools in turning operations has long been recognized as such tools are very hard and maintain a sharp cutting edge over long periods of time. Additionally, carbide turning tools permit high cutting speeds and high rates of metal removal. However, tungsten carbide turning tools are brittle, and in large sizes, are susceptible to breakage, and carbide cutting tools are difficult to contour, and are not usually utilized to produce the final configurations and surfaces desired.

To the applicants' knowledge, high-speed cutting tools and tungsten carbide cutting tools have not previously been utilized in the crankshaft turning art wherein the optimum characteristics of each type of cutting tool is utilized the maximum extent to minimize crankshaft machining time. It is recognized that crankshaft turning machines have long mounted a plurality of cutting tools upon a common tool support wherein the tools perform sequential turning operations, for instance, for rough and finish turning operations, and such as U.S. Pat. Nos. 1,919,738 and 2,191,935 discloses a plurality of turning tools for sequentially machining crankshaft surfaces.

It is also known to mount a plurality of crankshaft turning tools upon a common tool support wherein the tools are alternately used for forming cheek and bearing surfaces, and attention is directed to U.S. Pat. Nos. 2,148,293 and 2,596,511. However, known crankshaft machines of the aforementioned type utilize high-speed steel cutting tools during all phases of machining, and such prior art devices are not capable of meeting the high production demands desired from crankshaft turning machine tools presently being used.

SUMMARY OF THE INVENTION

It is an object of the invention to provide a method of turning crankshaft cheek and bearing surfaces in a sequential manner wherein the cheeks are turned by tungsten carbide cutting tools traversing the cheek surfaces at a relatively high rate of translation while the crankshaft is rotating at a relatively high speed, and sequentially turning a crankshaft bearing surface with a high-speed steel cutting tool mounted upon the same slide as the tungsten carbide cutting tools but at a relatively slow rate of rotation of the crankshaft.

Another object of the invention is to substantially reduce the machining time required to turn crankshaft cheek and bearing surfaces by taking optimum advantage of the particular cutting characteristics of tungsten carbide and high-speed steel tools.

A further object of the invention is to provide a tool support for use with a crankshaft turning machine capable of mounting both tungsten carbide and high-speed cutting tools wherein, during a single inwardly moving motion of the tool support, the tungsten carbide cutting tools turning the cheek surfaces are located in an operative position during the initial stages of tool movement and, during the final stage of tool translation, the tungsten carbide tools are displaced to an inoperative position while the high-speed steel bearing turning tool is located in an operative position and the tool support continues an inward movement, but at a reduced velocity.

In the practice of the invention a tool slide is supported upon a crankshaft turning machine for movement toward and away from a rotating crankshaft to be machined. A tool carrier is mounted upon the slide capable of being moved between first and second positions, preferably by a pivotal movement, and a pair of spaced tungsten carbide turning tools are mounted upon the carrrier as is a high-speed steel bearing turning tool vertically disposed above the carbide tools. An expansible motor mounted upon the slide shifts a sliding block upon the slide between first and second positions, and the sliding block cooperates with a cam surface and retaining surfaces defined upon the tool carrier which selectively positions the carrier to locate the tungsten carbide or high-speed steel cutting tools in operative position.

As the slide initially begins its movement toward the rotating crankshaft, the expansible motor is extended to pivot the carrier to its upper position locating the tungsten carbide cutting tools in a position to effectively machine the crankshaft cheeks. The slide is moved toward the crankshaft axis at a relatively high rate of translation while the carbide cutting tools are machining the cheeks surfaces and, during this time, the rate of rotation of the crankshaft will be relatively high in order to accommodate the rapid movement of the carbide tools and obtain maximum benefit of the superior rate of metal removal of carbide turning tools.

As the slide approaches the latter stages of its translation, the expansible motor is actuated to shift the sliding block relative to the carrier to permit the carrier to move downwardly shifting the carbide tools to an inoperative position and, simultaneously, the high-speed steel bearing tool is now operatively positioned relative to the crankshaft bearing surface to be machined thereby. At this time, and simultaneous with the vertical displacement of the tool carrier, the rate of inward translation of the tool slide substantially reduces, and the rate of crankshaft rotation, likewise, significantly reduces. Thus, as the high-speed steel tool engages the cylindrical bearing surface to be turned the rate of tool translation and workpiece rotation has reduced to a point acceptable to the high-speed steel turning tool and the desired contour, dimension and finish may be achieved. The turning of the bearing surface continues until completion, and at such time the slide reverses its direction of translation removing the turning tools from the crankshaft configuration.

The sliding block affixed to the expansible motor piston directly engages the slide and the tool carrier, and is disposed substantially directly below the cutting tools wherein the forces imposed upon the cutting tools during cutting are directly transmitted from the carrier to the slide through the sliding block. A cam surface defined on the carrier cooperates with rollers formed on the sliding block wherein the rollers reduce the frictional engagement between the sliding block and the carrier when pivoting the carrier to its uppermost position. Also, the carrier is formed with a locating surface which directly engages the slide when the sliding block is retracted and the carrier is in its lowermost position wherein cutting forces occurring during machining of the cylindrical bearing surface are directly transferred to the slide.

Preferably, a plurality of carbide cutting tool and high-speed cutting tool sets are located upon a common carrier wherein a plurality of cheeking surfaces and associated bearing surfaces may be simultaneously turned. It is contemplated that in a crankshaft machine tool of the center drive type that a pair of slides will be employed, each machining one-half of the crankshaft, and a feature of the invention is the rigidity and strength that the disclosed structure permits wherein the significant amounts of metal may be simultaneously removed from the crankshaft being turned, and yet a high degree of accuracy maintained.

BRIEF DESCRIPTION OF THE DRAWINGS

The aforementioned objects and advantages of the invention will be appreciated from the following description and accompanying drawings wherein:

FIG. 3 is a plan, detail view of the slide block utilized with the tool slide of the invention, FIG. 4 is a top plan view of the tool slide, the crankshaft being machined shown in dotted lines, FIG. 5 is an enlarged, detail, elevational, sectional view of stop means utilized with the tool carrier, as taken along section V—V of FIG. 4, FIG. 6 is an enlarged, detail, elevational, sectional view through the slide block along section VI—VI of FIG. 4 prior to elevation of the tool carrier, FIG. 7 is an elevational, sectional, detail view, similar to FIG. 6, illustrating the slide block in its extended position to elevate the tool carrier, FIG. 8 is an elevational, sectional, enlarged, detail view similar to FIG. 7 showing the slide block in elevation, and FIG. 9 is an enlarged, plan, detail view of the high-speed steel and carbide cutting tools constituting a set.

Figure 1:
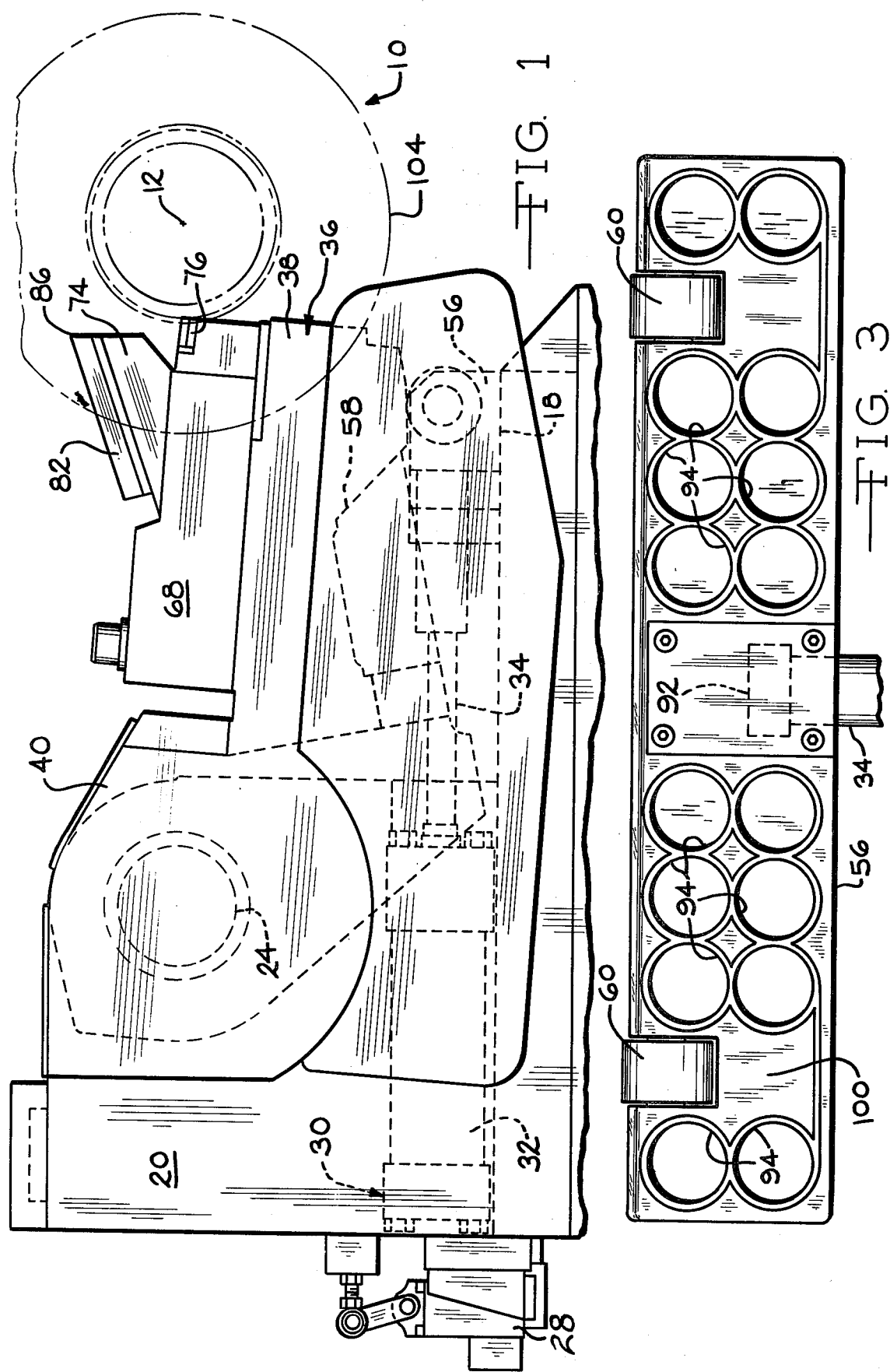
FIG. 1 is a side elevational view illustrating a tool slide, tool carrier, and associated structure in accord with the invention, showing the tool carrier in the elevated position at the termination of the cheek-turning operation.

DESCRIPTION OF THE PREFERRED EMBODIMENT.

In the drawings, the crankshaft being machined is illustrated in phantom lines at 10 and the axis of rotation is represented at 12. The crankshaft is mounted in a conventional crankshaft turning machine tool utilizing a head stock and tail stock to support the crankshaft, and tool slides are mounted upon the bed of the machine transversely movable to the axis of crankshaft rotation under power means to selectively engage the turning tools with the crankshaft. The crankshaft machine of the invention utilizes tool slides disposed below the crankshaft 10 and the tool slides may be powered by hydraulic or mechanical means. The general construction of the machine tool may be conventional and an example of a crankshaft machine tool utilizing transversely displaceable tool slides is shown in U.S. Pat. No. 2,141,466.

Figure 2:
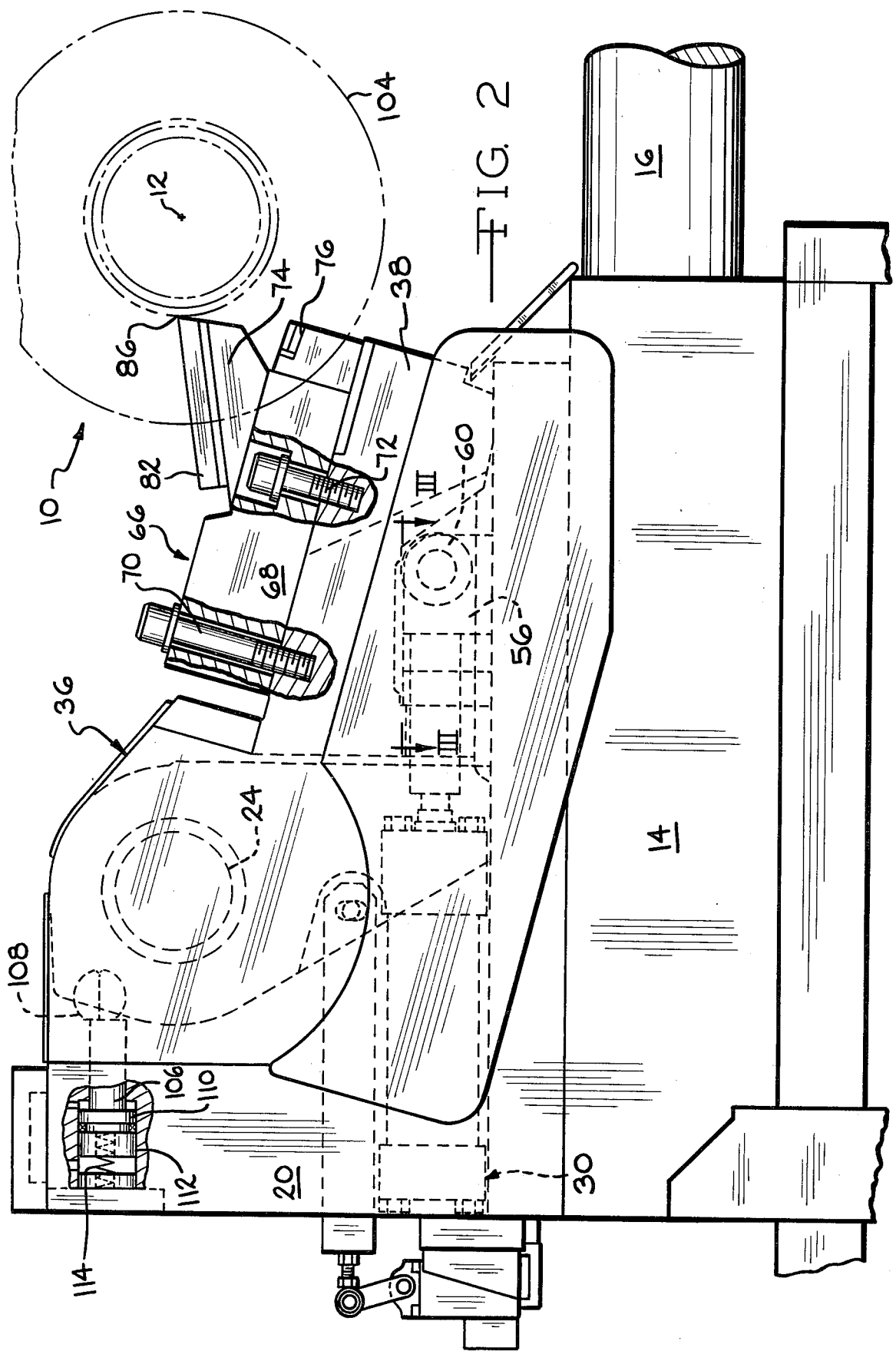
FIG. 2 is a view similar to FIG. 1, partially in section, illustrating the position of the tool carrier upon being lowered to the operative position for machining the crankshaft bearing surface with the high-speed steel cutting tool.

With reference to FIGS. 1 and 2, a tool slide 14 is illustrated slidably supported on ways, not shown, defined on the machine base for movement in a direction perpendicular to the axis of crankshaft rotation. Movement of the tool slide 14 is under control of an actuating rod 16, FIG. 2, which is connected to a hydraulic expansible motor, or other linear power means mounted upon the crankshaft machine tool base, not shown, capable of selectively moving the slide toward the right or left as viewed in FIGS. 1 and 2.

The slide 14 is of a length in the direction of the crankshaft axis 12 substantially one-half of the length of the crankshaft 10 being machined and, as a center drive crankshaft machine tool using the concepts of the invention would include two tool slides and associated carriers and tool holders which are of a mirror image of each other, only a single tool slide and associated structure is illustrated. The slide 14 includes a flat reference surface 18 located at the inner slide region disposed toward the crankshaft axis 12 and this surface acts as a guide surface for a slide block and further functions as a reference surface to position the tool carrier, as will be later described. The outer portion 20 of the slide 14 extends upwardly throughout the width of the slide and includes a plurality of bosses 22 in spaced relationship which are bored to receive a pivot shaft 24 for supporting the tool carrier. The slide 14 may include an adjustable limit switch stop 26, and a limit switch 28 mounted upon the base of the machine tool includes a roller actuator selectively engageable by the adjustable stop 26 to control machine slide functions.

An expansible motor 30 is mounted upon the tool slide 14, and includes a cylinder 32 from which a piston 34 extends. The cylinder communicates with a controlled source of pressurized fluid and valve structure, not illustrated, which controls the extension and retraction of the piston relative to the cylinder.

The tool carrier 30 consists of a heavy block of metal having a cutting tool mounting portion 38 disposed toward the crankshaft axis of rotation, and a journal portion including a plurality of fingers 40 which are closely received intermediate the bosses 22. The fingers 40 are bored to closely receive the pivot shaft 24 and, by means of the pivot shaft, the tool carrier 36 is pivotally mounted on the slide 14 for vertical oscillation about the axis of shaft 24. In this manner the cutting tool mounting portion 38 may be raised and lowered relative to the crankshaft axis 12 by means later described. Upward pivotal movement of the tool carrier is limited by means of a pair of stop bolts 42, FIG. 5, threaded into the tool slide 14 at their lower end. The upper ends of the stop bolts are provided with threads upon which the stop nut 44 and associated washers are mounted. The nut 44 is of the friction type wherein adjustment thereof by rotation on the associated threads will be accurately maintained regardless of vibration. The stop bolts 42 extend through elongated slots 46 and 48 defined in the tool carrier 36 and the slot 48 is of a lesser width than the slot 46 wherein a stop shoulder 50 is defined adpated to engage the underside of a stop washer when the tool carrier is pivoted to the maximum raised position as shown in dotted lines in FIG. 5. As will be appreciated from FIG. 5, the slots permit unrestricted movement of the carrier within its limits of movement and the slots are covered by caps 52 to prevent the entry of cutting chips.

The underside of the tool carrier 36 is provided with a recess 54 which extends the length of the carrier in a direction parrallel to the crankshaft axis. The recess 54 receives the slide block 56 and cam surfaces 58 are defined on the underside of the tool carrier within the recess at two locations in alignment with the side block rollers 60, FIGS. 6 and 7, which function to raise the tool carrier. The underside of the tool carrier is also provided with a positioning surface 62 which intersects the cam surfaces 58, and the surface 62 rests upon the slide block 56 at the carrier elevated position.

The lowermost position of the tool carrier 36 is determined by the flat reference surface 64 defined on the tool carrier throughout its length. The surface 64 engages the surface 18 defined on the tool slide when the tool carrier is in its lowermost position, and it will be appreciated that the surface 64 is located at the underside of the cutting tool mounting portion 38 wherein cutting forces imposed upon the carrier portion are primarily directed downwardly through the carrier 36, upon engaging surfaces 64 and 18.

A plurality of tool holder sets 66 are mounted upon the tool carrier in spaced relationship with respect to each other in a direction parallel to the crankshaft axis of rotation. The tool holder sets are mounted upon the carrier cutting tool mounting portion 36, and each set includes a lower block 68 bolted to the carrier portion 38 by bolts 70 and 72, and an upper block 74 is affixed to the block 68.

A pair of crankshaft cheek-turning tools 76 are mounted upon the lower block 68 adjacent opposite sides thereof, FIG. 9, and the tools 76 are of the tungsten carbide type and held in position upon the tool block 68 by threaded fasteners 78. As will be appreciated from FIG. 9, the tools 76 extend laterally from the sides of the block 68, and the outer edges of the tools mounted upon a common block define the width between opposed crankshaft cheek surfaces 80 to be turned upon the crankshaft to be turned.

The tool holder block 74 constitutes the support for the high speed steel bearing turning tool 82. The bearing turning tool 82 is of a width equal to the cylindrical bearing surface 84 to be turned on the crankshaft and, as will be appreciated from FIGS. 1 and 2, the cutting edge 86 of the tool 82 is linear in configuration. The cutting edges 88 of the carbide tools 76 mounted upon a common tool block are separated in the axial direction of the crankshaft a distance greater than the width of the associated bearing turning tool edge 86, as will be apparent from FIG. 9, and the aforedescribed cheeking and bearing tool structure will be similar to each of the tool block sets wherein both cheeking and bearing turning is to take place, such as at the tool blocks A and B, as indicated in FIG. 4.

The tool holder block indicated at C, FIG. 4, only uses a single cheeking tool 76 since the bearing surface 90 is located at an end of the crankshaft 10. However, the cheeking and bearing turning operation of the bearing surface 90 occurs simultaneously with the machining occurring at tool stations A and B.

The oscillation of the tool carrier 36 between the positions shown in FIGS. 1 and 2 is produced by the slide block 56 and the camming action produced by the slide block rollers 60 and the cam surfaces 58 formed on the tool carrier. The slide block 56 is of a width slightly less than the width separating the stop bolts 42, as indicated in dotted lines on FIG. 4, and is of a generally rectangular plan configuration, as will be appreciated from FIG. 3. The slide block includes a recess 92 receiving the end of the piston 34 wherein the block is firmly affixed to the end of the piston and may be moved in a direction toward and away from the axis of the crankshaft 10 as the piston is extended and retracted. On its upper and lower flat surfaces the slide block 56 is provided with a plurality of intersecting circular grooves 94 which are for the purpose of trapping oil and reducing the frictional movement of the slide block on the slide surface 18 and with respect to the carrier surface 62. Oil passages, not shown, are formed in the block 56 to supply oil to the grooves and a flexible conduit may be used to supply pressurized lubricating fluid to the block passages.

As will be noted in FIGS. 6 through 8, the pair of rollers 60 are mounted upon the slide block 56 rotatable about pivot shafts 96 mounted on the block. The rollers 60 are spaced in an axial direction with respect to the length of the crankshaft, as will be apparent in FIG. 4, and the upper forward edge of the block 56 is relieved at 98, FIG. 8, and the diameter of the rollers and the location of the pivot shafts thereof, are so related that the forward edge of the roller periphery, FIG. 8, extends slightly forward of the leading edge of the slide block. Thus, when the slide block 56 is received within the carrier recess 54, as shown in FIG. 8, extension of the piston 34 produces movement of the slide block to the right, and the rollers 60 will engage cam surfaces 58. This engagement will raise the tool carrier portion 38 and the movement of the slide block to the right, FIGS. 6–8, continues until the slide block 56 is positioned as shown in FIGS. 7 and 8. In this position the positioning surface 62 will be engaging the slide block upper surface 100. It is to be noted that the engagement between the surfaces 62 and 100 is permitted due to the fact that a clearance notch 102, FIG. 7, is formed in the tool carrier in alignment with the rollers 60 wherein the top periphery of the rollers may be received within the notch and the carrier will now be engaging the slide block directly when it is in the fully raised position. The rollers 60 provide an antifriction engagement between the slide block and the carrier while the cam surfaces 58 are engaged, but once the carrier has been fully raised its surface 62 will directly engage the upper surface 100 of the slide block assuring very accurate vertical positioning of the carrier and tools mounted thereon and provide a direct abutting relationship between the carrier and slide block. The presence of the oil-receiving grooves 94 lubricates the upper and lower surfaces of the slide block 56 and minimizes wear thereon due to the relative movement between the slide block, the slide surface 18 and the carrier surface 62.

When it is desired to lower the tool carrier 36 from the position shown in FIGS. 1, 7 and 8, the expansible motor 30 is actuated to retract the piston 34 to move the slide block 56 to the left, FIGS. 7 and 8, and this action permits the slide block to be withdrawn from the surface 62 wherein the rollers 60 will engage the cam surfaces 58 and lower the carrier position shown in FIG. 6 wherein the carrier reference surface 64 directly engages the slide surface 18. At this time the slide block 56 will be located within its recess 54 and the direct engagement of the tool carrier and slide 14 will permit forces imposed upon the tool carrier portion 38 during cutting to be directly transferred to the slide 14.

In operation, the crankshaft 10 will be chucked between the head stock and tail stock, not shown, of the machine tool and will be rotated at its higher turning speed at which the carbide cheeking tools 76 machine the crankshaft cheek surfaces 80. This rate of crankshaft rotation may be in the neighborhood of 120 rpm. At this time the power mechanism positioning the slide 14 will position the slide to its full left position as viewed in FIG. 1, which will locate the carbide tools 76 to the left of the maximum diameter of rotation of the crankshaft as it is being rotated as represented by circle 104, FIG. 1. At this time, the expansible motor 30 will be energized to displace the slide block 56 from the position of FIG. 6, to the position of FIGS. 7 and 8, which will raise the tool carrier mounting portion 38 to the position shown in FIG. 1. As described above, the lifting of the tool carrier portion is achieved by the rollers 60 engaging the cam surfaces 58, and the slide block is moved to the right to the extent shown in FIGS. 7 and 8 wherein a full engagement between the upper surface 100 of the block and the carrier positioning surface 62 is achieved. The lifting of the carrier portion 38 is such as to position the carbide cutting tool edges 88 at an elevation substantially aligned with the vertical position of the crankshaft axis of rotation.

At this time the movement of the slide 14 to the right, FIG. 1, can be initiated and the rate of slide movement is relatively high, for instance, in the neighborhood of 4½ inches per minute. Thus, the crankshaft will be rotating at a relatively high rate, while the cheeking turning tools 76 are in a cutting position and are also being moved toward the crankshaft axis at a relatively rapid rate. The machining of the cheeking surfaces 80 is achieved by the tungsten carbide tools at these relatively high rates of rotation and tool traversing and, at this time, no coolant is being sprayed upon the tools, as is the usual practice in crankshaft machines where only high speed steel tools are used.

Movement of the slide 14 continues until the carbide cheeking tools have completed the turning of the cheek surfaces 80 and the tools 76 will be located radially with respect to the crankshaft axis 12 as shown in FIG. 1. At this time, the position of the slide 14 is sensed, such as by limit switch 28, and motor 30 is rapidly energized to retract piston 34 and quickly move the slide block 56 from the position of FIG. 7 to that of FIG. 6. This movement of the slide block permits the carrier tool portion 38 to "drop" to the position shown in FIGS. 2 and 6, which will locate the high speed bearing turning tool 82 at its operative position as shown in FIG. 2. The bearing turning tool 82, during the cutting of the cheek surfaces 80, has been maintained in an upper and inoperative cutting position as shown in FIG. 1, however, upon the lowering of the carrier portion 38 the high speed cutting tool edge 86 is disposed on a vertical orientation substantially in alignment with the crankshaft axis 12, and the carbide tools 76 have lowered to an inoperative position as shown in FIG. 2.

Simultaneously with the lowering of the carrier tool mounting portion 38, the rotative speed of the crankshaft 10 is reduced to approximately 30 rpm., and the rate of traversing of the slide 14 toward the right, FIG. 2, is reduced to approximately 3/16 inch per minute from the previous rate of 3 inches per minute. Thus, during the cutting of the bearing surface 84 the crankshaft is rotating at a much slower rate than previously, and the tool 82 is being fed into the bearing surface at a much slower rate than occurred during the check-turning operation. Inward movement of the tool 82 continues until the desired diameter of the bearing surface 84 is achieved. During the cutting of surface 84 a cooling fluid is sprayed on the surface and tool 82 for cooling and lubrication, as is well known in the turning art. When the desired diameter has been machined, the direction of travel of the slide 14 is rapidly reversed and the tools are withdrawn from the crankshaft as the slide is moved to its retracted position. The crankshaft 10 may now be removed from its head stock and tail stock and a new crankshaft workpiece inserted to permit the cycle to be repeated.

It is to be understood that additional turning operations may be occurring on the crankshaft at the same time as the cheeking and bearing turning operations are taking place if the machine tool is provided with additional cutting tools and slides, not illustrated. For instance, spacing tools are often utilized with center drive crankshaft machines which may follow the cheeking tools, and such tools may be located upon the opposite side of the crankshaft 10 from the cheeking tools 76.

In order to prevent chattering or vibrations occurring in the carrier, a plurality of biasing plungers 106 may be mounted on the slide 14 to bias the carrier 36 in a clockwise direction, FIG. 2. The plungers 106 are slidably received within bores defined in the slide portion 20, and bear upon pads 108 located on the fingers 40 above the axis of the pivot shaft 24. The plungers 106 are provided with an enlarged head 110 slidably received within cylinders 112, and heavy duty springs 114 may be located within the cylinders biasing the plungers 106 to the right or, if desired, fluid pressure may be introduced into the cylinders to bias the plungers to the right and thereby aid in maintaining the tool carrier surfaces 62 and 64 in engagement with the slide block and slide surfaces 100 and 18, respectively.

With the slide 14 and the associated cutting tools being removed from the crankshaft the apparatus is now ready to repeat the cutting cycle as soon as a new crankshaft workpiece has been placed in the machine tool and upon the expansible motor 30 being energized to extend the piston to raise the carrier portion 38 to the position of FIG. 1, the aforedescribed cutting cycle may be repeated.

The aforedescribed crankshaft machining operation permits the cheek surfaces 80 to be quickly turned by carbide tools, substantially reducing the time required for turning the cheek surfaces as compared with conventional practice wherein high speed steel tools are used in the cheeking operation. By mounting the bearing turning tool 82 upon the same tool holder as the carbide tools and moving the tool to its operative position during movement of the slide 14 toward the crankshaft axis the accuracy and finish producible on the bearing surface 84 with a high speed steel cutting tool is achieved, yet the turning time is reduced to a minimum as no second operation, or reversal of the slide 14, is required.

A high degree of accuracy is achieved with the apparatus of the invention due to the use of a heavy slide 14, a large and heavy tool carrier 36 pivotally connected to the slide by a large diameter shaft 24 and high strength bosses 22 and fingers 40. Further, as the mounting portion 38 either directly engages the slide surface 18, or the slide block 56, no links or other mechanism is required which may tend to wear and misposition the carrier over a period of time. The majority of the cutting forces imposed upon the turning tools during cheeking and bearing turning are in a direction substantially perpendicular to these surfaces, and the apparatus of the invention permits high cutting forces to be accommodated without significant deflection or stress of the tools.

It is appreciated that various modifications to the inventive concept may be apparent to those skilled in the art without departing from the spirt and scope of the invention.

We claim:

1. The method of machining crankshafts for internal combustion engines having a cylindrical bearing surface and radial cheek surfaces radially spaced outwardly from said bearing surface by a high speed steel bearing surface turning tool and spaced tungsten carbide cheek turning tools, respectively, wherein said tools are mounted on a common traversing tool carrier and are each selectively positionable between operative and inoperative cutting positions on the carrier, comprising the steps of rotating the crankshaft to be machined about an axis at a high speed carbide cutting speed, tranversing the tool carrier in a direction toward the rotating crankshaft perpendicular to the axis of rotation at a first rate of tool carrier movement, positioning the carbide turning tools in the operative position thereof whereby the crankshaft cheeks are machined by the carbide tools during movement of said carrier at said first rate, upon completion of the turning of the crankshaft cheeks positioning the carbide turning tools to the inoperative position and positioning the bearing surface turning tool to its operative position to machine the crankshaft bearing surface, reducing the rate of crankshaft rotation, reducing the rate of traversing of the tool carrier toward the crankshaft to a second rate less than said first rate of movement to turn and size the crankshaft bearing surface, and reversing the direction of tool carrier traversing at completion of the machining of the bearing surface to withdraw the carrier and tools from the crankshaft.

2. In the method of machining crankshafts as in claim 1 wherein the movement of the tool carrier toward the crankshaft during sequential machining of the cheek surfaces and bearing surface is continuous between said first and second rates of carrier movement and the change in the rate of crankshaft rotation from the higher rate to the lower rate occurs substantially simultaneously with positioning of the bearing surface turning tool to its operative position.

3. The method of machining crankshafts for internal combustion engines having coaxial cylindrical bearing surfaces and radial cheek surfaces outwardly radially spaced from said bearing surfaces comprising the steps of rotating the crankshaft about an axis concentric with the bearing surfaces at a first high rate of rotation, machining the crankshaft cheek surfaces by rapidly traversing the cheek surfaces in a radial direction by tungsten carbide turning tools, upon completion of the turning of the cheek surfaces immediately reducing the rate of crankshaft rate of rotation and machining the crankshaft bearing surfaces with high speed steel turning tools while advancing the high speed steel turning tools into the crankshaft at a rate slower than the carbide turning tools traverse the cheek surfaces.

4. A crankshaft turning tool for machining crankshafts having a cylindrical bearing surface rotating about an axis and radial cheek surfaces radially spaced from the bearing surface and axis of rotation comprising, in combination, a slide guided for movement toward and away from the axis of crankshaft rotation in a direction transverse thereto, means connected to said slide for producing movement thereof, a tool carrier mounted on said slide having a cutting tool mounting portion vertically positionable between first and second positions relative to the axis of the crankshaft to be machined, power means mounted on said slide operatively associated with said carrier selectively positioning said carrier between said first and second positions, first and second tool holders mounted on said carrier cutting tool mounting portion, said first tool holder being vertically oriented above said second tool holder, a high speed steel turning tool mounted on one of said tool holders for turning a crankshaft bearing surface, a pair of tungsten carbide turning tools mounted on the other of said tool holders, said carbide turning tools being spaced from each other in the direction of the axis of the crankshaft to be machined and spaced apart a distance to simultaneously turn opposed cheek surfaces, said carbide turning tools being in an operative position relative to the crankshaft to be machined at said tool mounting position first position and in an inoperative position at said second position, and said high speed cutting turning tool being in an operative position relative to the crankshaft to be machined at said tool mounting portion second position and in an inoperative position at said first position.

5. In a crankshaft turning tool as in claim 4, said high speed steel turning tool being mounted upon the uppermost of said tool holders.

6. In a crankshaft turning tool as in claim 4, a pivot shaft mounted on said slide substantially perpendicularly related to the direction of slide movement, said tool carrier being pivoted on said shaft and said cutting tool mounting portion being radially spaced from said shaft and located intermediate said shaft and the crankshaft to be machined.

7. In a crankshaft turning tool as in claim 6, wherein said power means comprises an expansible motor including a cylinder mounted on said slide and a piston, a slide block affixed to said piston interposed between said slide and said carrier cutting tool mounting portion, a cam surface defined on said carrier engageable by said slide block whereby engagement of said slide block and cam surface vertically translates said tool mounting portion between said first and second positions, and carrier positioning means defined on said carrier tool mounting portion below said tools selectively engaging said slide block and said slide to position said tool mounting portion at said first and second positions, respectively.

8. In a crankshaft turning tool as in claim 7, wherein said carrier positioning means comprises a first surface defined on said carrier engaging said slide block at said carrier first position and a second surface defined on said carrier engaging said slide at said second position, said slide block being directly interposed between said first surface and said slide when engaging said first surface whereby the cutting forces imposed on said carrier while in said first position are substantially directly transferred to said slide through said block.

9. In a crankshaft turning tool as in claim 7, a roller defined on said slide block engaging said cam surface upon extension of said piston whereby said roller comprises antifriction means interposed between said slide block and cam surface, and clearance means defined on said carrier receiving said roller when said carrier first surface is engaging said slide block when said carrier is at said first position.

10. In a crankshaft turning tool as in claim 1, biasing means mounted on said slide engaging said carrier biasing said carrier toward said second position.

* * * * *